United States Patent
Niewiadomski et al.

(10) Patent No.: US 11,155,298 B2
(45) Date of Patent: Oct. 26, 2021

(54) MODIFIED STEERING ANGLE AT COMPLETION OF HITCH ASSIST OPERATION

(71) Applicant: Ford Global Technologies, LLC, Dearborn, MI (US)

(72) Inventors: Luke Niewiadomski, Dearborn, MI (US); Kyle Simmons, New Boston, MI (US); Roger Arnold Trombley, Ann Arbor, MI (US); Arnav Sharma, Canton, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 16/558,571

(22) Filed: Sep. 3, 2019

(65) Prior Publication Data

US 2021/0061354 A1 Mar. 4, 2021

(51) Int. Cl.
| | |
|---|---|
| *G05D 1/00* | (2006.01) |
| *B60W 30/18* | (2012.01) |
| *B62D 15/02* | (2006.01) |
| *B60W 10/20* | (2006.01) |
| *B60W 10/18* | (2012.01) |
| *B60D 1/36* | (2006.01) |

(52) U.S. Cl.
CPC .......... *B62D 15/025* (2013.01); *B60W 10/18* (2013.01); *B60W 10/20* (2013.01); *B60W 30/18036* (2013.01); *B60D 1/36* (2013.01)

(58) Field of Classification Search
CPC .... B60W 10/20; B60W 30/12; B60W 50/045; B60W 2050/046; B60W 2510/20; B62D 15/025; B62D 6/002; B62D 6/001; G05D 1/0229; G05D 1/0223
USPC ...................................................... 701/23, 41
See application file for complete search history.

(56) References Cited

U.S. PATENT DOCUMENTS

| | | | |
|---|---|---|---|
| 5,309,289 | A | 5/1994 | Johnson |
| 5,729,194 | A | 3/1998 | Spears et al. |
| 8,308,182 | B2 | 11/2012 | Ortmann et al. |
| 8,888,120 | B2 | 11/2014 | Trevino |
| 9,102,271 | B2 | 8/2015 | Trombley et al. |
| 9,499,018 | B2 | 11/2016 | Gehrke et al. |
| 9,731,568 | B2 | 8/2017 | Wuergler et al. |
| 10,266,023 | B2 | 4/2019 | Mattern et al. |
| 2005/0074143 | A1 | 4/2005 | Kawai |
| 2011/0216199 | A1 | 9/2011 | Trevino et al. |

(Continued)

*Primary Examiner* — B M M Hannan
(74) *Attorney, Agent, or Firm* — Raymond Copiellie; Price Heneveld LLP

(57) ABSTRACT

A vehicle maneuvering apparatus comprises a steering control system configured to control a steering angle of a plurality of steered wheels of a vehicle. The controller is further configured to control the vehicle to stop in a stopped position upon completing a vehicle alignment routine and identify an alignment error distance between the hitch and the coupler position in the stopped position. The controller is further configured to calculate a change distance of the hitch based on the steering angle and calculate an aligned steering error distance. The aligned steering error distance is calculated by comparing the change distance to the alignment error. Based on the aligned steering error distance, the controller may selectively suppress the steering angle alignment routine.

20 Claims, 9 Drawing Sheets

(56) References Cited

U.S. PATENT DOCUMENTS

| | | |
|---|---|---|
| 2012/0283909 A1 | 11/2012 | Dix |
| 2014/0012465 A1 | 1/2014 | Shank et al. |
| 2014/0226009 A1 | 8/2014 | Lynam et al. |
| 2016/0052548 A1 | 2/2016 | Singh et al. |
| 2016/0059889 A1* | 3/2016 | Herzog ................ B62D 15/027 701/41 |
| 2016/0288601 A1* | 10/2016 | Gehrke ................ G06K 9/6201 |
| 2017/0151846 A1* | 6/2017 | Wuergler ................ B60D 1/62 |
| 2018/0251153 A1 | 9/2018 | Li et al. |
| 2018/0253608 A1 | 9/2018 | Diessner et al. |
| 2018/0319438 A1 | 11/2018 | Herzog |
| 2020/0108679 A1* | 4/2020 | Golgiri .................... B60D 1/36 |
| 2020/0361466 A1* | 11/2020 | Xu ........................... B60D 1/62 |

* cited by examiner

MODIFIED STEERING ANGLE AT COMPLETION OF HITCH ASSIST OPERATION

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sightlines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Accordingly, further advancements may be desired.

SUMMARY OF THE DISCLOSURE

According to one aspect of the present disclosure, a vehicle maneuvering apparatus comprises a steering control system configured to control a steering angle of a plurality of steered wheels of a vehicle. The system further comprises a sensor configured to capture sensor data and a controller. The controller is configured to identify a coupler position of a trailer in the sensor data and control a vehicle alignment routine adjusting a position of the vehicle and the steering angle, thereby substantially aligning a hitch of the vehicle with the coupler position. The controller is further configured to control the vehicle to stop in a stopped position upon completing the vehicle alignment routine and identify an alignment error distance between the hitch and the coupler position in the stopped position. The controller is further configured to calculate a change distance of the hitch based on the steering angle and calculate an aligned steering error distance. The aligned steering error distance is calculated by comparing the change distance to the alignment error. Based on the aligned steering error distance, the controller may selectively suppress a steering angle alignment routine.

Examples of various aspects of the disclosure can include any one or a combination of the following features:
  the controller is further configured to: in response to the aligned steering error distance less than an alignment threshold, control the steering control system to perform a steering alignment; and in response to the steering aligned error distance greater than an alignment threshold, suppress the steering angle alignment routine;
  the steering angle alignment routine comprises the steering control system adjusting the steering angle of the steered wheels aligned with a forward operating direction of the vehicle;
  the controller is further configured to: identify a change direction of the change distance and an error direction of the alignment error distance;
  wherein the aligned steering error distance is calculated as a summation of a change magnitude in the change direction of the change distance and an error magnitude in the error direction of the alignment error distance;
  the controller is further configured to in response to the steering aligned error distance greater than an alignment threshold, compare the change direction to the error direction;
  the controller is further configured to in response to the change direction being opposing the error direction, controlling the steering control system to complete the steering angle alignment routine;
  the aligned steering error distance is a lateral distance calculated as an approximation of a movement of the hitch as a result of controlling the steering angle of the steered wheels aligned with the forward direction of the vehicle;
  the alignment error distance comprises a lateral distance between the coupler position and the hitch relative to a rearward operating direction of the vehicle;
  the alignment error distance is calculated based on a trajectory of the vehicle; and/or
  the alignment error distance is detected based on the sensor data.

According to another aspect of the present disclosure, a method for controlling a vehicle alignment is disclosed. The method comprises identifying a coupler position of a trailer in sensor data and controlling a motion and steering angle of the vehicle positioning a hitch of the vehicle in an aligned position substantially aligning the hitch with the coupler position. The method further comprises identifying an alignment error distance between the hitch and the coupler position in the stopped position and calculating a change distance of the hitch based on the steering angle. The method further comprises selectively adjusting the steering angle reducing the alignment error distance by the change distance.

Examples of various aspects of the disclosure can include any one or a combination of the following method steps or features:
  the change distance is an approximation of the motion of the hitch resulting from the adjusting of the steering angle;
  identifying a change direction of the change distance and an error direction of the alignment error distance;
  comparing the alignment error distance to an alignment threshold and, in response to the alignment error distance exceeding the alignment threshold, summing the change distance in the change direction with the alignment error distance in the error direction yielding a steering corrected distance based on the steering angle;
  in response to the steering corrected distance being less than the alignment threshold, controlling the steering angle thereby adjusting the hitch position by the change distance; and/or
  in response to the steering corrected distance being greater than the alignment threshold, outputting an alignment error notification.

According to yet another aspect of the present disclosure, a vehicle maneuvering apparatus is disclosed. The apparatus comprises a steering control system configured to control a steering angle of a plurality of steered wheels of a vehicle and a sensor configured to capture sensor data. A controller is configured to identify a coupler position of a trailer in the sensor data and control a vehicle alignment routine adjusting a position of the vehicle and the steering angle, thereby substantially aligning a hitch of the vehicle with the coupler position. The controller is further configured to control the vehicle to stop in a stopped position upon completing the vehicle alignment routine and identify an alignment error distance between the hitch and the coupler position in the stopped position. The controller is further configured to calculate a change distance of the hitch based on the steering angle selectively adjust the steering angle reducing the alignment error distance by the change distance. The change distance is an approximation of the motion of the hitch resulting from the adjustment of the steering angle.

Examples of various aspects of the disclosure can include any one or a combination of the following features:

identify a change direction of the change distance and an error direction of the alignment error distance; and/or the controller is further configured to compare the alignment error distance to an alignment threshold; in response to the alignment error distance exceeding the alignment threshold, sum the change distance in the change direction with the alignment error distance in the error direction yielding a steering corrected distance based on the steering angle; in response to the steering corrected distance being less than the alignment threshold, control the steering angle thereby adjusting the hitch position by the change distance; and in response to the steering corrected distance being greater than the alignment threshold, output an alignment error notification.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
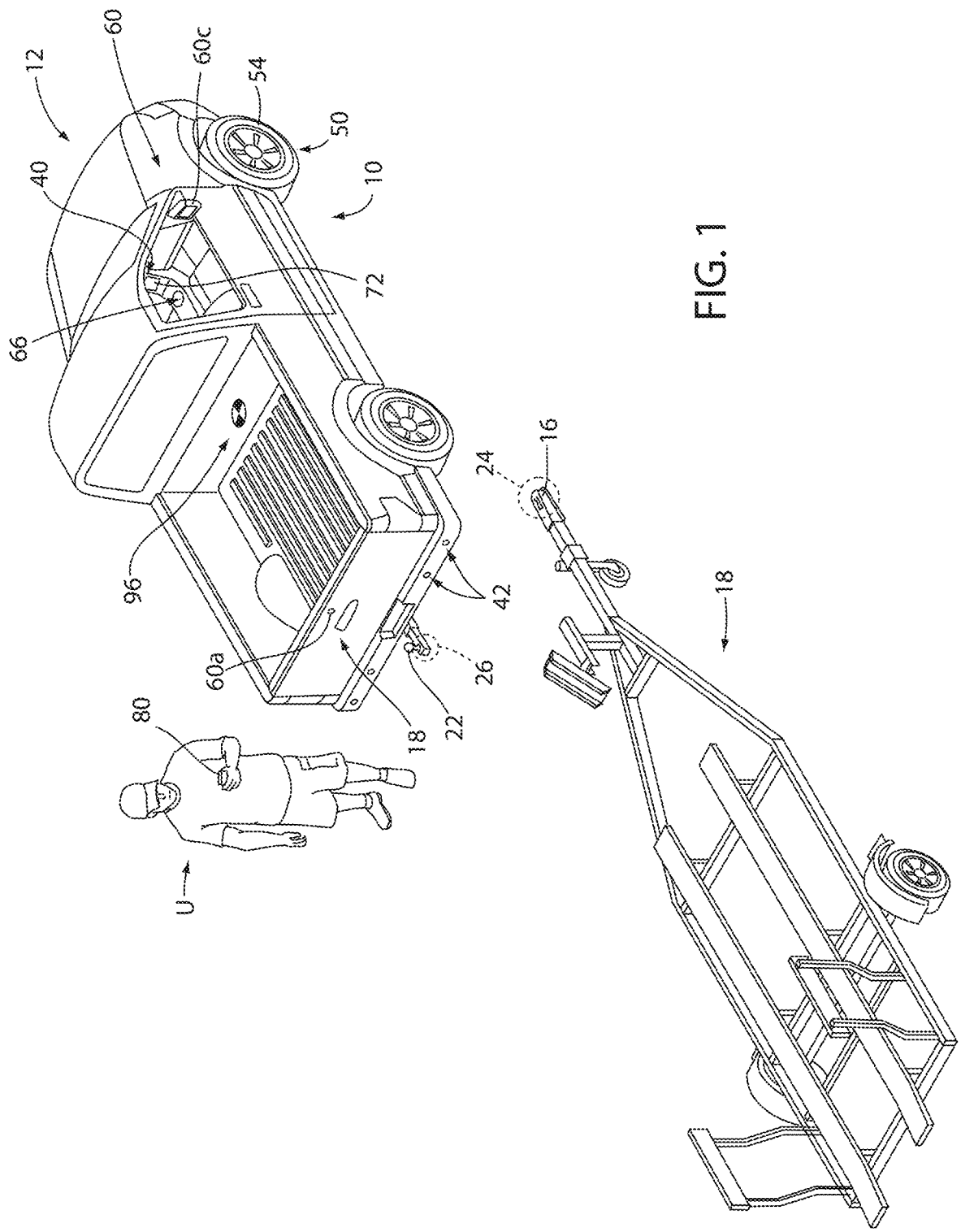
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some instances, an attempt by the system 10 to achieve an alignment between the hitch position 26 and the coupler position 24 may result in an alignment error. The alignment error may be the result of limitations of steering angle δ range, variation in a location identified for the coupler position 24, and various errors/limitations of the system 10. Accordingly, as discussed herein, the alignment of the hitch ball 22 with the coupler 16 may be an approximate alignment that may vary over an error range. In order to limit any adverse effects of the alignment error to the operation of the system 10, the controller 14 may be configured to adjust the hitch position 26 relative to the coupler 16 after the motion of the vehicle 12 has been halted or stopped. The adjustment of the hitch position may be accomplished as a result of an adjustment of the steering angle S.

In some implementations, the controller 14 may be configured to adjust the steering angle to improve an alignment of the hitch position 26 with the coupler position 24. For example, the controller 14 may be configured to adjust the lateral position of the hitch ball 22 relative to a rearward operating direction by changing the orientation of steered wheels of the vehicle 12. Similarly, the controller 14 may be configured to omit a steering angle alignment routine that may increase the alignment error between the hitch position 26 and the coupler position 24. In this way, the system 10 may provide for improved alignment between the vehicle 12 and the trailer 18. Further discussion of the alignment methods following the stoppage of the vehicle 12 is provided in detail in reference to FIGS. 6-9.

Figure 2:
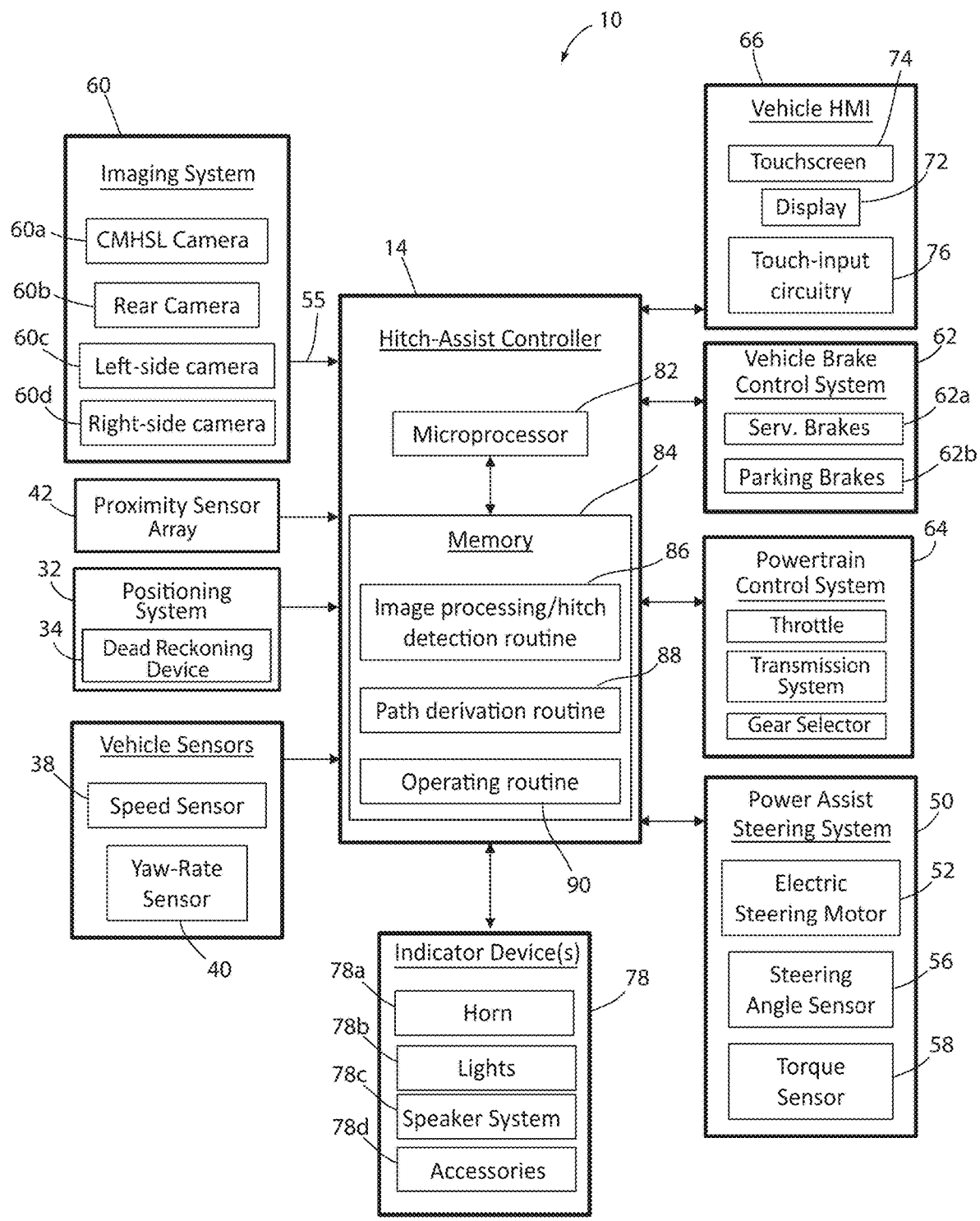
FIG. 2 is a diagram of a system according to an aspect of the disclosure for assisting in aligning the vehicle with a trailer in a position for hitching the trailer to the vehicle.
Figure 3:
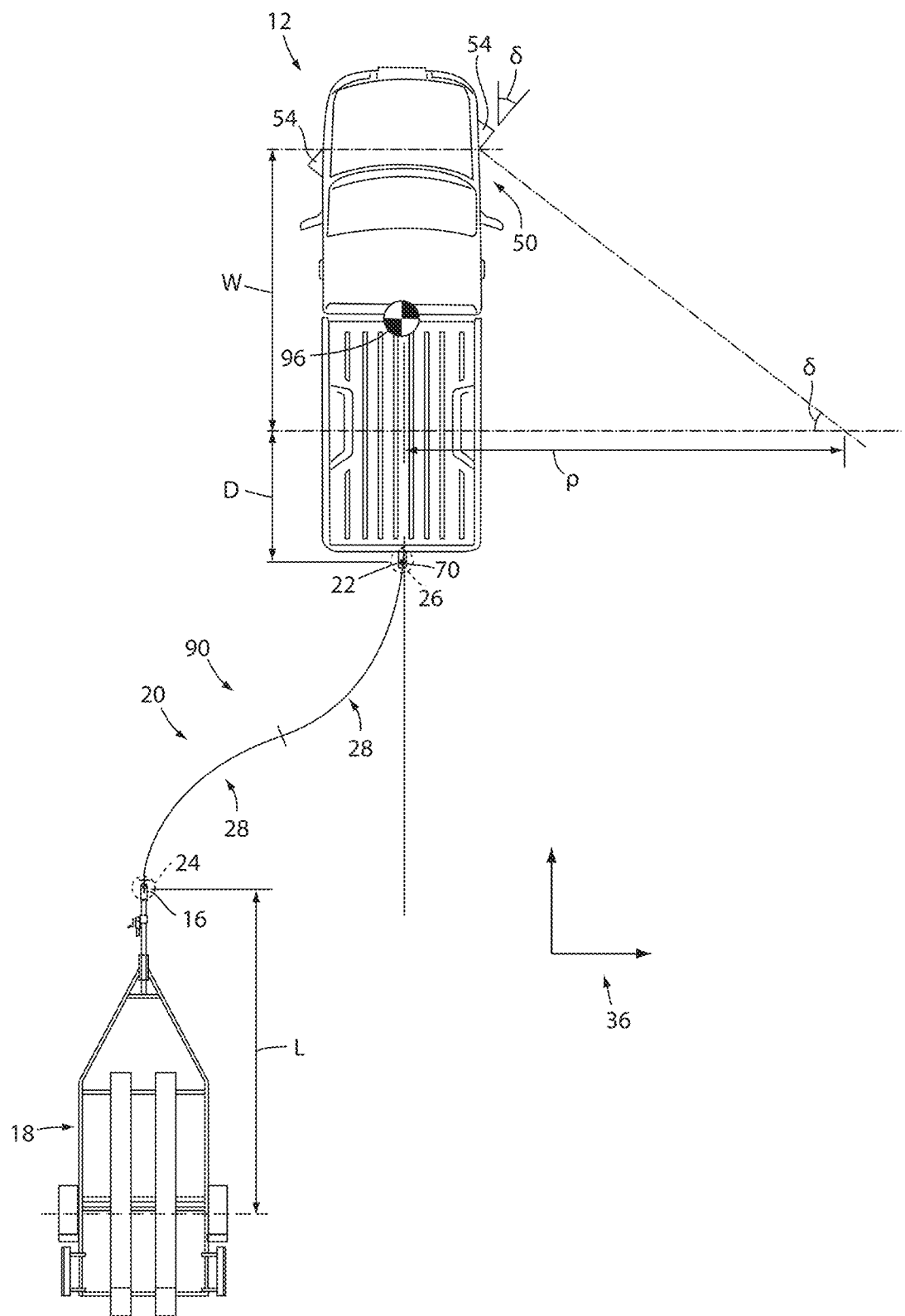
FIG. 3 is a plan view of a vehicle during a step of the alignment sequence with the trailer.
Figure 4:
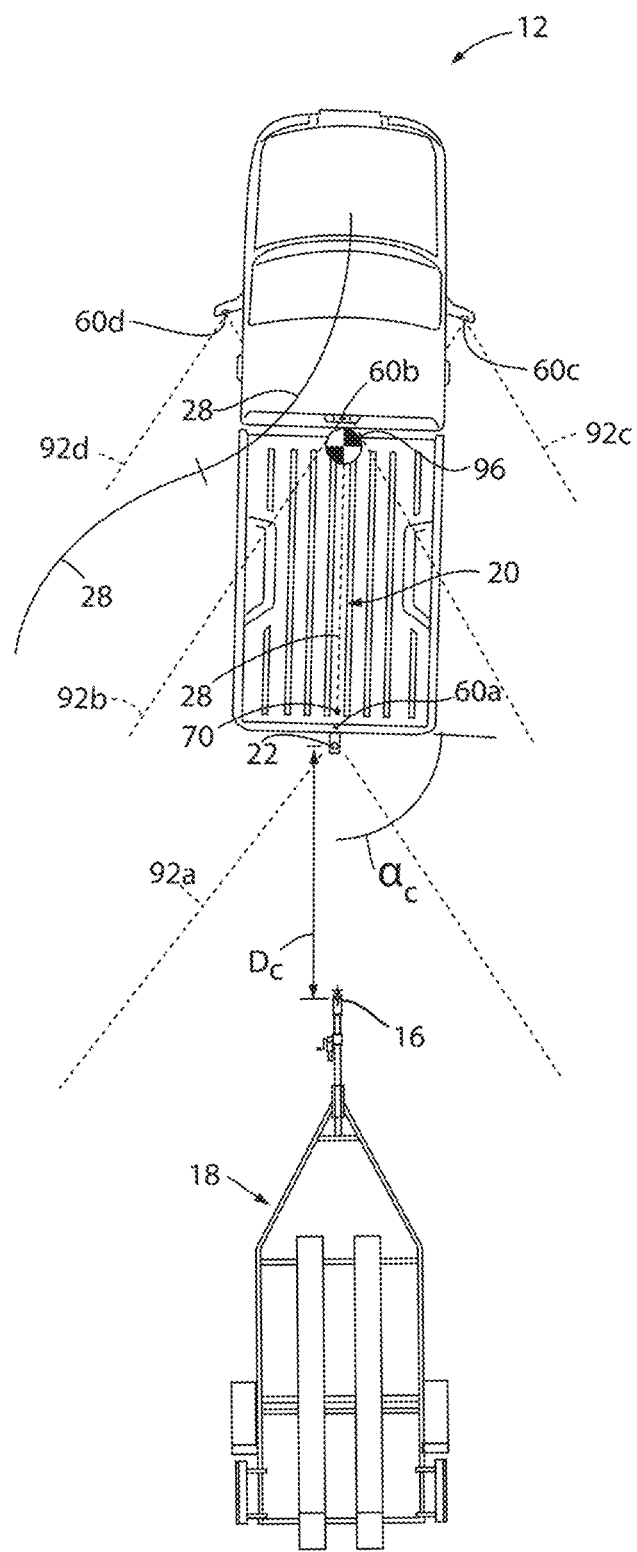
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle $\delta$ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height $H_c$ and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle $\delta$ based on a steering command, whereby the steering angle $\delta$ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from the movement of the steered wheels 54 of such a vehicle.

With continued reference to FIG. 2, the power-assist steering system 50 provides the controller 14 of the hitch assist system 10 with information relating to a rotational position of steered wheels 54 of the vehicle 12, including a steering angle $\delta$. The controller 14 in the illustrated embodiment processes the current steering angle, in addition to various vehicle 12 conditions, to guide the vehicle 12 along the desired path 20 (FIG. 3). It is conceivable that the hitch assist system 10, in additional examples, may correspond to an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a contact with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated contact with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent contact from occurring with trailer 18.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78*a*, lights 78*b*, a speaker system 78*c*, vehicle accessories 78*d*, etc. In some embodiments, the indicator devices 78 may further include one or more accessories 78*d*, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60*a*, center high-mount stoplight (CHMSL) camera 60*b*, and side-view cameras 60*c* and 60*d*, although other arrangements including additional or alternative cameras are possible. In one example, imaging system 60 can include rear camera 60*a* alone or can be configured such that system 10 utilizes only rear camera 60*a* in a vehicle with multiple exterior cameras. In another example, the various cameras 60*a*-60*d* included in the imaging system 60 can be positioned to generally overlap in their respective fields of view, which in the depicted arrangement include fields of view 92*a*, 92*b*, 92*c*, and 92*d* to correspond with rear camera 60*a*, center high-mount stoplight (CHMSL) camera 60*b*, and side-view cameras 60*c* and 60*d*, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92*a*, 92*b*, 92*c*, and 92*d*, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60*a*, 60*b*, 60*c*, and 60*d* within imaging system 60. In either example, the image processing routine 86 can include information related to the positioning of any cameras 60*a*, 60*b*, 60*c*, and 60*d* present on vehicle 12 or utilized by system 10, including relative to a center 96 (FIG. 1) of vehicle 12, for example, such that the positions of cameras 60*a*, 60*b*, 60*c*, and 60*d* relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266, 023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle δ can be used to determine a corresponding turning radius ρ for vehicle 12 according to the equation:

$$\rho = \frac{1}{W \tan \delta} \quad (1)$$

in which the wheelbase W is fixed and the steering angle δ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60a-d of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92a of rear camera 60a such that image data can be processed to determine the height $H_b$ of hitch ball 22 on a real-time or on-demand basis.

Figure 5A:
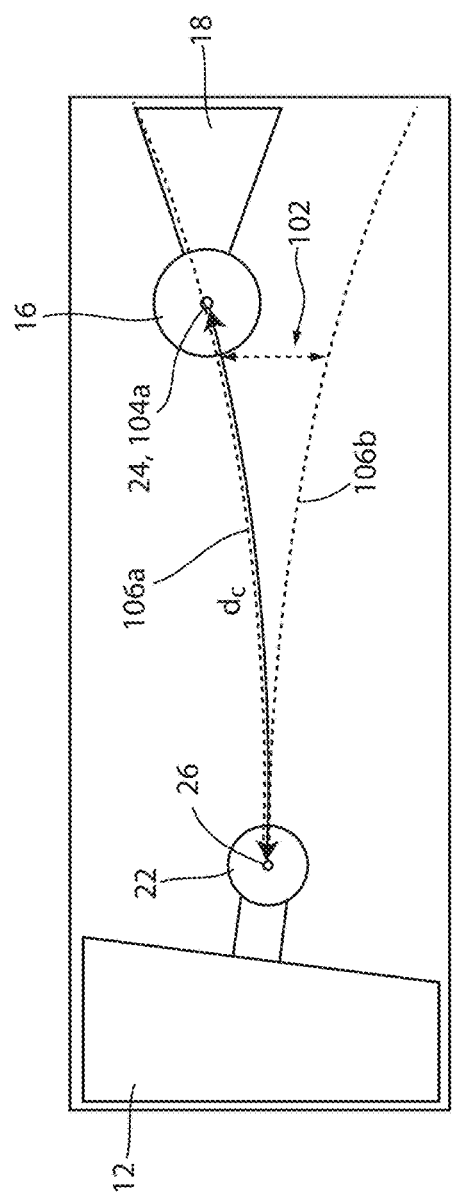
FIG. 5A is a diagram of a hitch ball of a vehicle approaching a coupler of a trailer demonstrating a trajectory range of the vehicle.
Figure 5B:
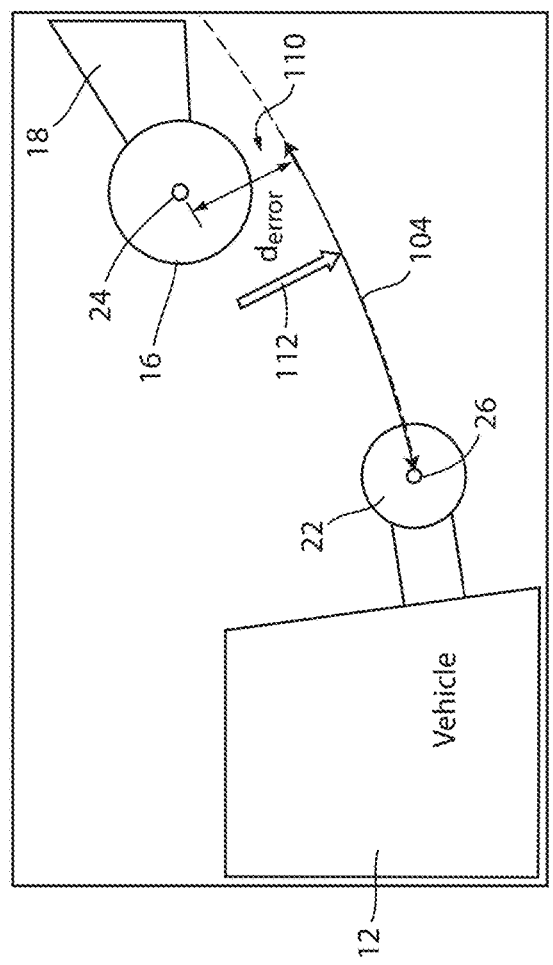
FIG. 5B is a diagram of a hitch ball of a vehicle approaching a coupler of a trailer demonstrating a trajectory range of the vehicle.

Referring now to FIGS. 5A and 5B, detailed diagrams of the hitch ball 22 and the coupler 16 are shown demonstrating a trajectory range 102 of the hitch ball 22. In operation, the range and associated travel of the trajectory range 102 decreases as the distance $D_c$ to coupler 16 decreases. Accordingly, the system 10 may be increasingly susceptible to errors in alignment between the hitch ball 22 and the coupler 16 as the distance $D_c$ to coupler 16 decreases. For example, the system 10 may provide for a greater trajectory range 102 and adjust to correct for more variation in a detected location of the coupler position 24 when the coupler position is further away from the vehicle 12. Accordingly, as discussed herein, the system 10 may provide for various methods and operations to limit the error associated with the detection of the coupler location 24 and correct for alignment issues that may result from such errors. In this way, the system 10 may provide for adjustments in order to prevent alignment errors resulting from signal noise and/or fluctuations in the coupler position 24 throughout an alignment operation.

As discussed in reference to the capability of the system 10 to maneuver the vehicle 12 and the hitch ball 22 over the trajectory range 102, the operation of the controller 14 may only be discussed in reference to the movement in a reverse direction in a single pass without correction or adjustment in a forward direction. However, various embodiments of the system 10 may provide for autonomous and/or semi-autonomous maneuvering of the vehicle 12 in the forward and/or reverse directions. The operation of the system 10 may be more efficient and comfortable for one or more operators and/or passengers of the vehicle 12 if the movement is controlled in a steady rearward path without significant changes in the direction or acceleration of the vehicle 12. Abrupt changes in the rate and/or direction of operation may cause users to be uneasy and less likely to trust the operation of the system 10. Additionally, the capability of the system 10 to control the alignment of the hitch ball 22 with the coupler 16 by controlling motion in the reverse direction may provide for the control routine and alignment of the vehicle 12 with the trailer 18 for vehicles that are only capable of assisted or semi-autonomous operation in the reverse direction. In this way, the disclosure may provide for a flexible solution that may be implemented in various configurations to provide the beneficial operations discussed herein.

In general, the trajectory range 102 of the vehicle 12 may be based on the dimensions and operating ranges (e.g. maximum steering angle $\delta_{max}$) of the vehicle 12. That is, in operation, the controller 14 may adjust the steering angle $\delta$ to control a trajectory 104 of the vehicle 12. As shown in FIGS. 5A and 5B, the trajectory range 102 may extend over the range of the steering angle $\delta$ from a first steering extent 106a to a second steering extent 106b. As previously discussed in reference to equations 1 and 2 in reference to FIGS. 3-4, the minimum turning radius $\rho_{min}$ of the vehicle 12 may define the trajectory range 102 of the vehicle 12 in both lateral directions relative to the reverse motion of the vehicle 12. That is, based on the maximum steering angle $\delta_{max}$, the controller 14 of the system may identify the trajectory range 102 in which the vehicle 12 may be operable to align the hitch ball 22 with the coupler 16. Based on this trajectory range 102, the controller 14 may also determine whether the target position of the hitch ball position 26 must be adjusted to continue the alignment routine without resulting in an error due to the position 24 of the coupler 16 being outside the trajectory range 102.

As previously discussed, in some instances, the hitch ball position 26 may not be perfectly aligned with the coupler position 24 when the motion of the vehicle 12 is controlled to stop by the controller 14. The resulting distance between the hitch ball position 26 and the coupler position 24 may be referred to as an alignment error 110 with a corresponding error distance $d_{error}$ and error direction 112. The alignment error 110 may be the result of limitations of the steering angle $\delta$ range and the corresponding trajectory range 102, variation in the detected coupler position 24, and various errors/limitations of the system 10 discussed herein. Accordingly, as discussed herein, the alignment of the hitch ball 22 with the coupler 16 may be an approximate alignment that may vary over an error range. The error range may be related to the resolution, accuracy, and sophistication of various components discussed herein. Accordingly, the approximate alignment of the hitch ball position 26 with the coupler position 24 may result in the alignment error 110.

Figure 6:
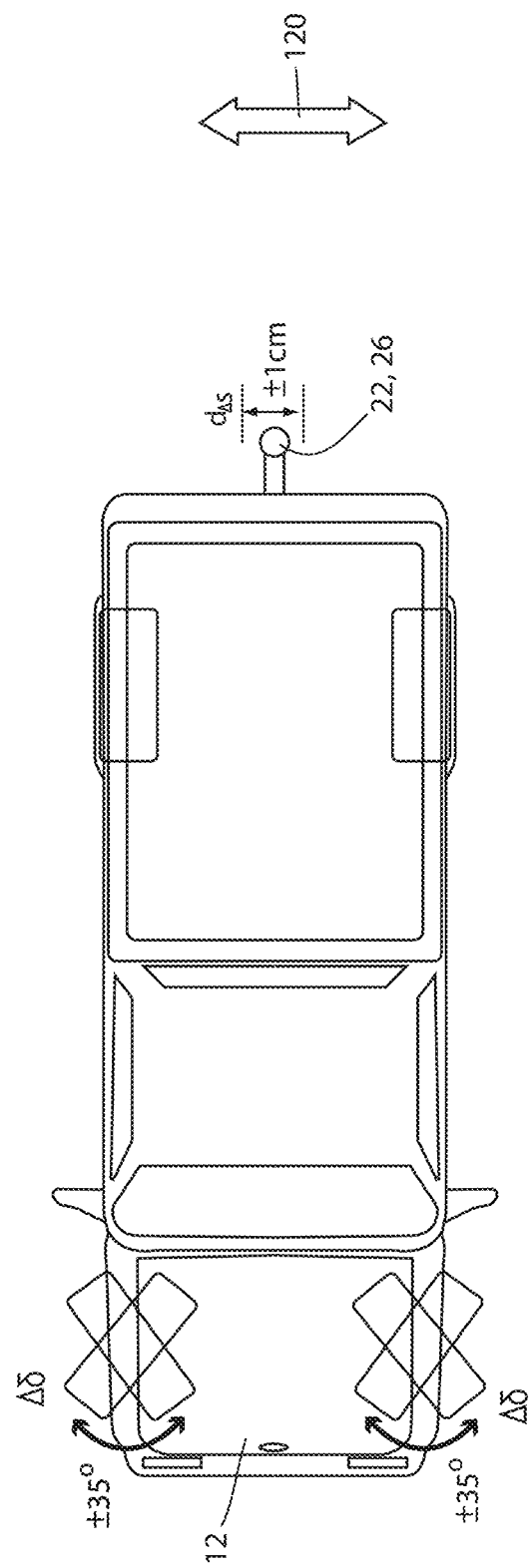
FIG. 6 is a diagram of a vehicle demonstrating a change distance effectuated by adjusting a steering angle of the vehicle.

Referring now to FIG. 6, a diagram of a vehicle is shown demonstrating a steering adjustment change distance $d_{AS}$ of the hitch ball 22 resulting from an adjustment of the steering angle $\delta$ of the vehicle 12. As previously discussed, the controller 14 may be configured to adjust the hitch position 26 relative to the coupler 16 after the motion of the vehicle 12 has been halted or stopped. In some implementations, the controller 14 may be configured to adjust the steering angle $\delta$ to improve an alignment of the hitch position 26 with the coupler position 24. For example, the controller 14 may be configured to adjust the lateral position of the hitch ball 22 relative to a rearward operating direction by changing the orientation of steered wheels 54 of the vehicle 12. The resulting motion of the hitch ball 22 is represented as the steering adjustment change distance $d_{AS}$ of the hitch ball 22.

In general, the control of the steering angle $\delta$ to adjust the lateral position of the hitch ball 22 may be applicable in a variety of situations. For example, the adjustment of the steering angle $\delta$ and the resulting change distance $d_{AS}$ may be controlled by the controller 14 to improve an alignment and decrease the alignment error 110 of the detected hitch position 26 relative to the coupler position 24. Similarly, the controller 14 may be configured to omit or suppress a steering angle alignment routine that may increase the alignment error 110 between the hitch position 26 and the coupler position 24. In this way, the system 10 may provide for improved alignment between the vehicle 12 and the trailer 18.

In general, an approximation of the change distance $d_{AS}$ of the hitch ball 22 may be calculated by the controller 14 in relation to a number of parameters, which may vary among vehicles with different geometries and proportions. In general, the controller 14 may be configured to calculate or approximate the change distance $d_{AS}$ of the hitch ball 22 based on the following parameters: a steering range $\Delta\delta$, vehicle constants (e.g. wheelbase length, suspension settings, steering geometry, tire diameter, etc.), the drawbar length L, etc. The relationship between the steering angle $\delta$ and the change distance dos of the hitch ball 22 may be programmed into the controller 14 as a calibration step that may be identified based on vehicle parameters and/or observed results utilized to approximate the relationship between the steering angle $\delta$ and the change distance dos of the hitch ball 22. As a result of the programming and/or calibration of the system 10, the controller 14 and/or the steering system 50 may be configured to approximate or calculated the expected change distance for every degree of change of the steering angle $\delta$. In this way, the system 10 may be configured to improve the alignment of the hitch ball 22 with the coupler 16.

In operation, the steering system 50 may be configured to control an adjustment range 46 of a steering $\delta$. The adjustment range $\Delta\delta$ may vary from $\delta_{min}$ to $\delta_{max}$, which may vary among vehicles. As illustrated in FIG. 6, the available change distance dos is approximately 1 cm with a corresponding steering range 46 of +/−35 degrees (deg.). However, the change distance dos may be less than 1 cm and may in some cases be approximately 2-3 cm. Accordingly, based on the geometry of the vehicle 12, an adjustment of the steering angle from a −30 deg. to a +15 deg. may result in a change distance dos of approximately 6 mm. Based on such observations, the controller 14 may be calibrated to approximate the change distance dos and a corresponding change direction 120 that may result from an adjustment of the steering angle δ. In this way, the system 10 may be configured to laterally adjust the hitch position 26 and provide for improved alignment of the hitch ball 22 with the coupler 16 after the motion of the vehicle 12 has been halted.

Figure 7:
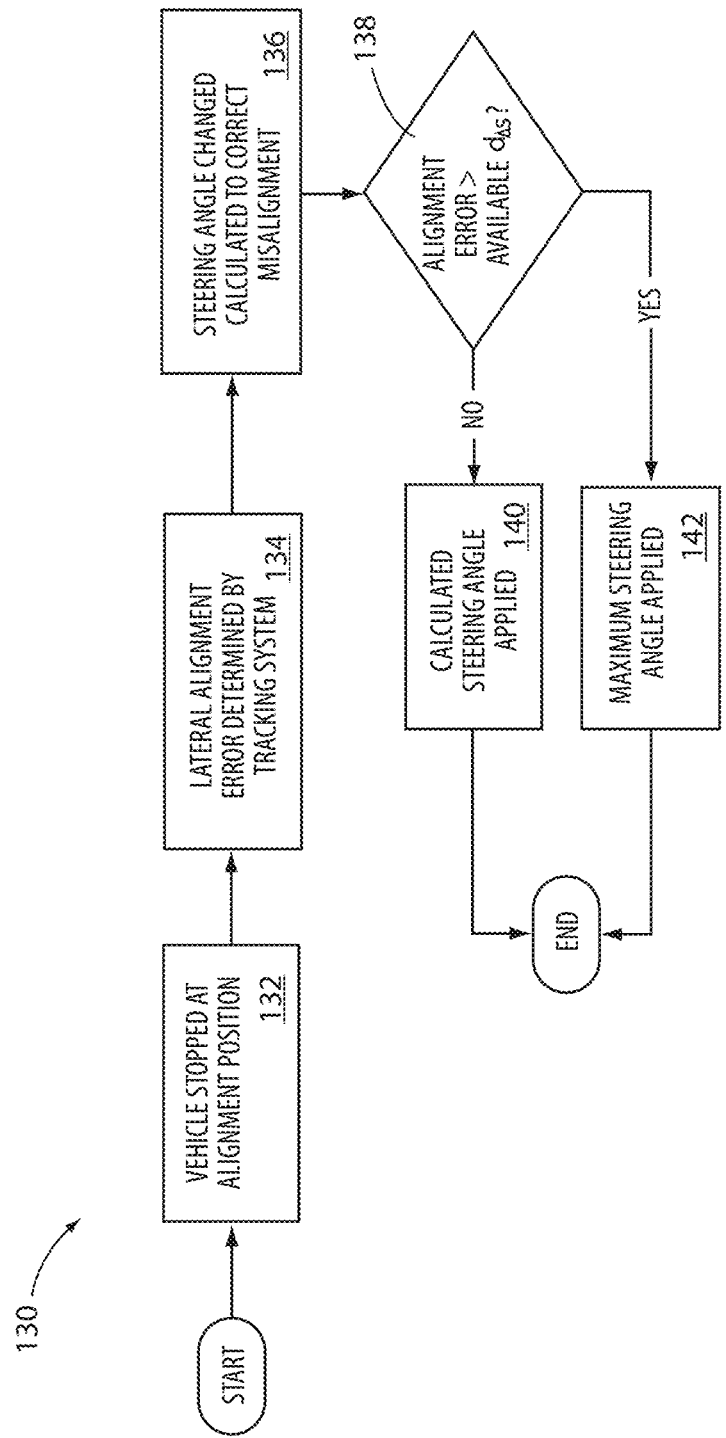
FIG. 7 is a flow chart demonstrating a method for adjusting a hitch position of a hitch ball of a vehicle based on a steering angle adjustment.

Referring now to FIG. 7 a flow chart is shown demonstrating a method 130 for adjusting the hitch position 26 of the hitch ball 22 based on an adjustment of the steering angle δ. In operation, the system 10 may be configured to identify the coupler position 24 via the image processing routine 86. Once the coupler position 24 is identified, the controller 14 may utilize the coupler position 24 to process the path derivation routine 88 and navigate the vehicle along the vehicle path 20. Upon substantially aligning the hitch ball 22 with the coupler 16, the controller 14 may control the vehicle brake control system 62 and the powertrain control system 64 to stop the vehicle (132).

Once the motion of the vehicle 12 is halted, the controller 14 may continue the method 130 by identifying the alignment error 110 (e.g. the error distance $d_{error}$ and error direction 112) (134). The alignment error 110 may be calculated based on the trajectory 104 of the hitch ball 22 and/or detected via the image processing routine 86 based on the sensor data gathered via the imaging system 60, the positioning system 32, the proximity sensor array 42, etc. Once the alignment error 110 is identified, the controller 14 may continue to process the method 130 by calculating the available change distance $d_{AS}$ of the hitch ball 22 in the change direction 120 based on the current steering angle steering angle δ (136). As previously discussed, the change distance $d_{AS}$ of the hitch ball 22 may correspond to an approximation of the lateral motion of the hitch ball 22 resulting from the adjusting of the steering angle δ. The calculation of the change distance $d_{AS}$ may take into account the available steering range 46 of the steering system 50 as a result of the steering angle δ of the vehicle 12 when the rearward motion of the vehicle 12 is halted. That is, the available steering range 46 of the steering system 50 may be limited in the change direction 120 needed to limit or decrease the error distance $d_{error}$ of the alignment error 110 in the opposing error direction 112 due to the steering angle δ of the vehicle upon stopping the vehicle 12. Additionally, the available change distance $d_{AS}$ may exceed the error distance $d_{error}$ in which case, the controller 14 may calculate the change in the steering angle δ necessary to approximately eliminate the alignment error 110.

In step 138, the controller 14 may determine whether the available change distance $d_{AS}$ in the change direction 120 opposite the error direction 112 is greater than the error distance $d_{error}$. If the available change distance $d_{AS}$ is greater than the error distance $d_{error}$, the controller 14 may continue by calculating the change in the steering angle δ necessary to approximately eliminate the alignment error 110 (140). If the available change distance $d_{AS}$ is less than the error distance $d_{error}$, the controller 14 may continue by applying the maximum change distance $d_{AS}$ based on the available steering range 46 in the change direction 120 opposing the error direction 112 to limit the alignment error 110 (142). Following the adjustment of the steering angle, in steps 140 or 142, the controller 14 may complete the method 130.

In some embodiments, the alignment error may be so significant, the alignment of the hitch position 26 with the coupler position 24 results in an alignment error. In such circumstances, the controller 14 may apply steps similar to those discussed in the method 130, but, rather than determining it the available change distance $d_{AS}$ is greater than the error distance $d_{error}$, the controller 14 may instead calculate whether the available change distance $d_{AS}$ is sufficient to limit the error distance $d_{error}$ such that the error distance $d_{error}$ no longer exceeds an alignment threshold. If the controller 14 determines that the available change distance $d_{AS}$ is sufficient to decrease the error distance $d_{error}$ below the alignment threshold, the controller 14 may apply the available change distance $d_{AS}$ and output an indication (e.g. via the HMI 66) that that the alignment was successful. However, if the controller 14 determines that the available change distance dos is not sufficient to decrease the error distance $d_{error}$ below the alignment threshold, the controller 14 may output an indication that an error occurred in the alignment process. Accordingly, the alignment methods and processes discussed herein may be applied in a variety of ways to improve the operation of the system 10.

As discussed herein, the alignment threshold may correspond to a predetermined value of the error distance $d_{error}$ considered too great to report a successful alignment. Accordingly, the alignment threshold may vary based on the capability and design of the system 10. Additionally, the comparison of the alignment error 110 to the available change distance dos may correspond to an arithmetic comparison (e.g. a summation) of the error distance $d_{error}$ in the error direction 112 with the available change distance dos in the change direction 120. Based on such a calculation, the controller 14 may be configured to determine a resulting error distance $d_{error}$ and/or calculate the necessary change in the steering angle δ necessary to approximately eliminate the alignment error 110.

Figure 8:
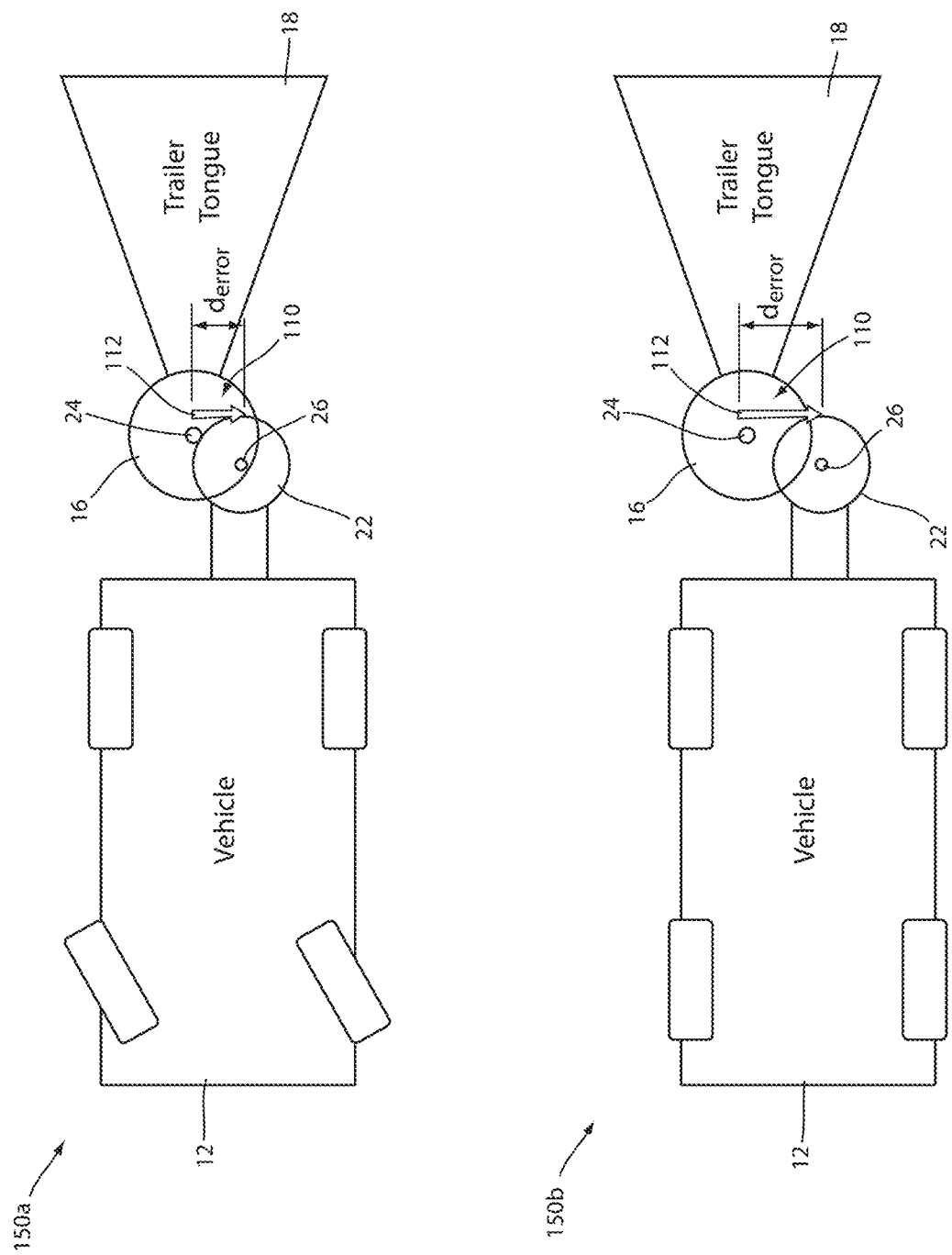
FIG. 8 is a diagram of a vehicle demonstrating a change distance of a coupler resulting from a steering angle alignment routine.

Referring now to FIG. 8, a plurality of diagrams of the vehicle 12 are shown demonstrating the steered wheels 54 in first orientation 150a and a second orientation 150b. The first orientation 150a may correspond to a skewed or turned orientation, wherein the steering angle δ is turned following the stoppage of the vehicle 12 at the end of the path 20. The second orientation 150b may correspond to an aligned orientation, which may be a desirable orientation to adjust the steered wheels 54 following the alignment of the hitch ball 22 with the coupler 16. The steering angle alignment routine may be applied by the controller 14 to control the steering system 50 to align the steered wheels with the forward operating direction of the vehicle 12. In some implementations, the controller 14 may be configured to control the steering system 50 to align the steered wheels with the forward operating direction of the vehicle 12. However, the changing the steering angle δ of the vehicle 12 may result in the hitch position 26 shifting laterally over the change distance dos, which may result in an alignment error or an increase in the error distance $d_{error}$.

In some instances, change of the steering angle δ necessary to achieve alignment may be trivial. However, in some instances, the change distance dos resulting from a steering angle alignment routine may result in an alignment error, wherein the error distance $d_{error}$ is greater than the alignment threshold. In order to avoid the exacerbation of the alignment error 110, the controller 14 may be configured to determine whether an alignment routine of the steered wheels 54 should be suppressed in order to avoid an alignment error or an increase in the error distance $d_{error}$. Accordingly, the controller 14 may be configured to selectively suppress the wheel alignment routine if the change distance $d_{AS}$ would result in an alignment error or an increase in the error distance $d_{error}$.

Figure 9:
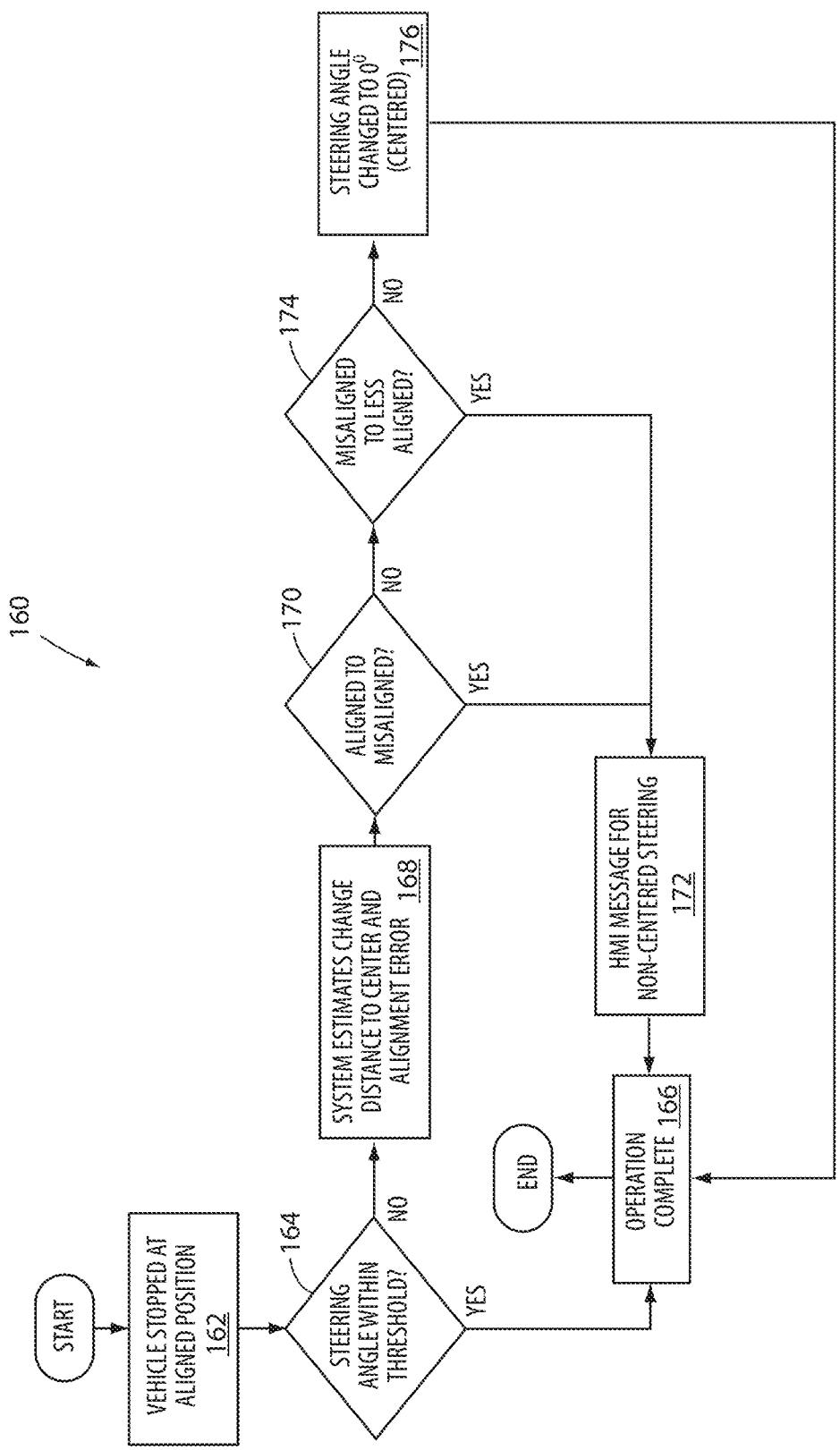
FIG. 9 is a flow chart demonstrating a method for controlling a steering angle alignment routine in accordance with the disclosure.

FIG. 9 is a flow chart demonstrating a method 160 for controlling or suppressing the steering angle alignment routine. Referring now to FIGS. 8 and 9, the method 160 may begin by identifying the coupler position 24 and processing the path derivation routine 88 to navigate the vehicle along the vehicle path 20. Once the hitch ball 22 is substantially aligned with the coupler 16, the controller 14 may control the vehicle brake control system 62 and the powertrain control system 64 to stop the vehicle 12 (162). Following the stoppage of the vehicle 12, the controller 14 may identify the steering angle δ to determine if the steering angle δ is within an alignment range (164). The alignment range may correspond to a variation (e.g. +/−0-4 deg.), in which the steering may generally be considered to be aligned with the forward operating direction of the vehicle 12. If the steering angle δ is already within the alignment range, the controller 14 may continue to step 166 to complete the method 160. If the steering angle δ is outside the alignment range, the controller 14 may continue to calculate change distance $d_{\Delta S}$ of the hitch ball 22 that will result from the alignment routine (168). Additionally, in step 168, the controller 14 may identify the alignment error 110 (e.g. the error distance $d_{error}$ and error direction 112). As previously discussed, the alignment error 110 may be calculated based on the trajectory 104 of the hitch ball 22 and/or detected via the image processing routine 86 based on the sensor data gathered via the imaging system 60, the positioning system 32, the proximity sensor array 42, etc.

Following step 168, the controller 14 may compare the error direction 112 with the change direction 120. In step 170, the controller 14 may determine if the alignment routine will further misalign or increase the error distance $d_{error}$. If the distance error distance $d_{error}$ will increase, the controller 14 may suppress the alignment routine and display a message on the HMI 66 indicating that the steering angle δ was not centered (172). If the error distance $d_{error}$ will not increase, the controller 14 may continue to step 174. In step 174, the controller 14 may determine if the alignment routine will align or decrease the error distance $d_{error}$. If the error distance $d_{error}$ will decrease, the controller 14 may activate the alignment routine by controlling the steered wheels 54 to be oriented aligned with the forward operating direction of the vehicle 12 (176). If the alignment error 110 is determined to increase in step 174, the controller 14 may continue to step 172 and suppress the alignment routine. Following step 172, the controller 14 may complete the method 160.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle maneuvering apparatus comprising:
a steering control system configured to control a steering angle of a plurality of steered wheels of a vehicle; and
a controller configured to:
control a vehicle alignment routine adjusting a position of the vehicle and the steering angle thereby substantially aligning a hitch of the vehicle with a coupler position of a trailer;
control the vehicle to stop in a stopped position upon completing the vehicle alignment routine;
identify an alignment error distance between the hitch and the coupler position in the stopped position;
calculate a change distance of the hitch based on the steering angle;
calculate an aligned steering error distance by comparing the change distance to the alignment error; and
selectively suppress a steering angle alignment routine based on the aligned steering error distance.

2. The apparatus according to claim 1, wherein the controller is further configured to:
in response to the aligned steering error distance less than an alignment threshold, control the steering control system to perform a steering alignment; and
in response to the steering aligned error distance greater than an alignment threshold, suppress the steering angle alignment routine.

3. The apparatus according to claim 1, wherein the steering angle alignment routine comprises the steering control system adjusting the steering angle of the steered wheels aligned with a forward operating direction of the vehicle.

4. The apparatus according to claim 1, wherein the controller is further configured to:
identify a change direction of the change distance and an error direction of the alignment error distance.

5. The apparatus according to claim 4, wherein the aligned steering error distance is calculated as a summation of a change magnitude in the change direction of the change distance and an error magnitude in the error direction of the alignment error distance.

6. The apparatus according to claim 4, wherein the controller is further configured to:

in response to the steering aligned error distance greater than an alignment threshold, compare the change direction to the error direction.

7. The apparatus according to claim 6, wherein the controller is further configured to:
in response to the change direction opposing the error direction, controlling the steering control system to complete the steering angle alignment routine.

8. The apparatus according to claim 1, wherein the aligned steering error distance is a lateral distance calculated as an approximation of a movement of the hitch as a result of controlling the steering angle of the steered wheels aligned with a forward direction of the vehicle.

9. The apparatus according to claim 1, wherein the alignment error distance comprises a lateral distance between the coupler position and the hitch relative to a rearward operating direction of the vehicle.

10. The apparatus according to claim 1, wherein the alignment error distance is calculated based on a trajectory of the vehicle.

11. The apparatus according to claim 1, further comprising a sensor configured to capture sensor data, wherein the alignment error distance is detected based on the sensor data.

12. A method for controlling a vehicle alignment comprising:
identifying a coupler position of a trailer in sensor data;
controlling a motion and steering angle of the vehicle positioning a hitch of the vehicle in an aligned position substantially aligning the hitch with the coupler position;
identifying an alignment error distance between the hitch and the coupler position in a stopped position;
calculating a change distance of the hitch based on the steering angle; and
selectively adjusting the steering angle reducing the alignment error distance by the change distance.

13. The method according to claim 12, wherein the change distance is an approximation of a motion of the hitch resulting from the adjusting of the steering angle.

14. The method according to claim 12, further comprising:
identifying a change direction of the change distance and an error direction of the alignment error distance.

15. The method according to claim 14, further comprising:
comparing the alignment error distance to an alignment threshold; and
in response to the alignment error distance exceeding the alignment threshold, summing the change distance in the change direction with the alignment error distance in the error direction yielding a steering corrected distance based on the steering angle.

16. The method according to claim 15, further comprising:
in response to the steering corrected distance being less than the alignment threshold, controlling the steering angle thereby adjusting the hitch position by the change distance.

17. The method according to claim 16, further comprising:
in response to the steering corrected distance being greater than the alignment threshold, outputting an alignment error notification.

18. A vehicle maneuvering apparatus comprising:
a steering control system configured to control a steering angle of a plurality of steered wheels of a vehicle;
a sensor configured to capture sensor data; and
a controller configured to:
identify a coupler position of a trailer in the sensor data;
control a vehicle alignment routine adjusting a position of the vehicle and the steering angle thereby substantially aligning a hitch of the vehicle with the coupler position;
control the vehicle to stop in a stopped position upon completing the vehicle alignment routine;
identify an alignment error distance between the hitch and the coupler position in the stopped position;
calculate a change distance of the hitch based on the steering angle; and
selectively adjust the steering angle reducing the alignment error distance by the change distance, wherein the change distance is an approximation of a motion of the hitch resulting from the adjustment of the steering angle.

19. The apparatus according to claim 18, wherein the controller is further configured to:
identify a change direction of the change distance and an error direction of the alignment error distance.

20. The apparatus according to claim 19, wherein the controller is further configured to:
compare the alignment error distance to an alignment threshold;
in response to the alignment error distance exceeding the alignment threshold, sum the change distance in the change direction with the alignment error distance in the error direction yielding a steering corrected distance based on the steering angle;
in response to the steering corrected distance being less than the alignment threshold, control the steering angle thereby adjusting the hitch position by the change distance; and
in response to the steering corrected distance being greater than the alignment threshold, output an alignment error notification.

* * * * *